(12) United States Patent
Falchetto et al.

(10) Patent No.: US 8,411,094 B2
(45) Date of Patent: Apr. 2, 2013

(54) RENDERING MODULE FOR BIDIMENSIONAL GRAPHICS

(75) Inventors: Mirko Falchetto, Milzano (IT);
Massimiliano Barone, Cormano (IT);
Danilo Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 965 days.

(21) Appl. No.: 12/474,111

(22) Filed: May 28, 2009

(65) Prior Publication Data

US 2009/0295811 A1    Dec. 3, 2009

(30) Foreign Application Priority Data

May 29, 2008    (IT) ............................... MI2008A0999

(51) Int. Cl.
*G06T 1/00* (2006.01)
*G06T 15/40* (2011.01)

(52) U.S. Cl. ........................................ 345/506; 345/421

(58) Field of Classification Search .................. 345/421, 345/506

See application file for complete search history.

(56) References Cited

U.S. PATENT DOCUMENTS

| 5,945,997 A * | 8/1999 | Zhao et al. ..................... 345/581 |
| 2001/0055015 A1 * | 12/2001 | Iourcha et al. ................ 345/421 |
| 2002/0158865 A1 * | 10/2002 | Dye et al. ...................... 345/419 |

* cited by examiner

*Primary Examiner* — Jeffrey Chow
(74) *Attorney, Agent, or Firm* — Seed IP Law Group PLLC (57) ABSTRACT

The disclosure relates to a graphics module for rendering a bidimensional scene on a display screen comprising a graphics pipeline of the sort-middle type, said graphics pipeline comprising: a first processing module configured to clip a span-type input primitive received from a rasterizer module into sub-span type primitives to be associated to respective macro-blocks corresponding to portions of the screen, and to store said sub-span type primitives in a scene buffer; a second processing module configured to reconstruct the span-type input primitive starting from said sub-span type primitives, the second processing module being further intended to implement a culling operation of sub-span type primitives of the occluded type.

34 Claims, 7 Drawing Sheets

RENDERING MODULE FOR BIDIMENSIONAL GRAPHICS

BACKGROUND

1. Technical Field

The present disclosure relates to a rendering module for bidimensional (2D) graphics and, particularly, having a graphic processing chain or, in an equivalent manner, a graphics pipeline, for the rendering of bidimensional scenes.

2. Description of the Related Art

Computerized graphics is the technique of generating images on a hardware device, such as, for example, a screen or a printer, via a computer. The generation of images or objects to be represented on a display device is usually referred to as rendering.

In the field of bidimensional (2D) graphics, a 2D graphics pipeline for the rendering of images is known, which is based on a data processing approach in a so-called immediate mode (immediate mode rendering pipeline or, briefly, IMR pipeline).

By immediate mode data processing is meant, as stated, an immediate processing of data, i.e., in the order in which they are received by the 2D graphics pipeline and a contextual rendering of the data processed on the bidimensional display surface. As it can be inferred, in an immediate mode approach, each object to be displayed is processed and rendered on the screen independently from the other objects of the scene.

The IMR-type 2D graphics pipeline has as a drawback to result to be not very efficient in terms of band loading and costs in the case that operations intended both to improve the quality of the scenes to be displayed and intended to reduce the working load of the same graphics pipeline are implemented. Such drawbacks may negatively impact the performance of a graphic application using the IMR-type 2D graphics pipeline.

BRIEF SUMMARY

The present disclosure provides a 2D graphics pipeline of an alternative type to the above-mentioned IMR-type 2D graphics pipeline In some embodiments, the present disclosure may at least partially reduce the drawbacks thereof, particularly as regards the band loading and memory loading of the graphics pipeline and the performance of the graphic application in which the same graphics pipeline is employed.

In one embodiment of the present disclosure, a graphics module is provided for rendering a bidimensional scene on a display screen. In one such embodiment, the graphics module includes a sort-middle graphics pipeline, the sort-middle graphics pipeline including: a scene buffer; a first processing module configured to clip a span-type input primitive received from a rasterizer module into sub-span type primitives to be associated with respective macro-blocks corresponding to portions of the display screen and to store said sub-span type primitives in the scene buffer; and a second processing module configured to reconstruct, starting from the sub-span type primitives, the span-type input primitive, the second processing module being further configured to cull occluded sub-span type primitives of the sub-span type primitives.

BRIEF DESCRIPTION OF THE SEVERAL VIEWS OF THE DRAWINGS

Further characteristics and advantages of the present disclosure will become clear from the description reported below of preferred exemplary embodiments, given by way of non-limiting, illustrative examples, with reference to the annexed Figures, in which.

DETAILED DESCRIPTION

Figure 1:
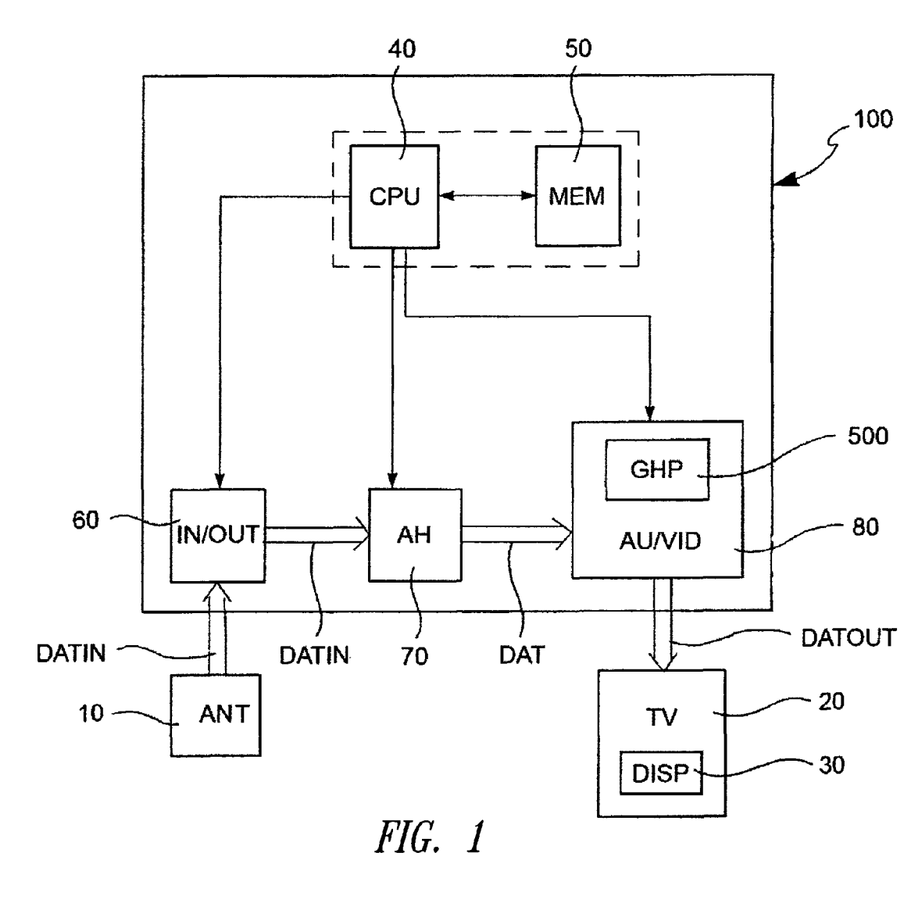
FIG. 1 schematically illustrates a graphics system in accordance with an exemplary embodiment.

FIG. 1 shows a graphics system 100 in accordance with an exemplary embodiment of the disclosure, including a rendering graphics module 500 (GHP) or also graphics pipeline.

The graphics system 100 of FIG. 1 is, for example, an encoding/decoding apparatus for digital television, also known as set-top box but, in accordance with other embodiments of the disclosure, it can be another graphics system, such as a mobile telephone, a PDA (Personal Digital Assistant) palmtop, a multimedia device with a VGA type screen (e.g., terrestrial digital receiver, DVIX readers, or MP3 reader), a computer (for example, a personal computer), a gaming device (for example, PS3), and so on.

The encoding/decoding apparatus 100 is preferably of the HDTV type, i.e., for the application in the high definition television (HDTV).

The encoding/decoding apparatus 100 for digital television is configured to receive an encoded input data flow DATIN (video and/or audio data) from an outer antenna 10 (ANT) in order to provide a corresponding encoded data flow DATOUT to a television apparatus 20 (TV) provided with at least one display screen 30 (DISP) and operatively connected to the encoding/decoding apparatus 100.

In more detail, the encoding/decoding apparatus 100 comprises a central processing unit 40 (CPU), for example a microprocessor or a microcontroller, operatively connected to a primary system memory 50 (MEM).

The encoding/decoding apparatus 100 further comprises an input/output device 60 (IN/OUT) operatively connected to and controlled by the central processing unit 40 (CPU) in order to receive the encoded input data flow DATIN.

In addition, the encoding/decoding apparatus 100 comprises an electronic device 70 (AH) prearranged for the encryption/decryption of digital data. In more detail, the electronic device 70 is a hardware accelerator operating under the control of the central processing unit 40 in order to decrypt the decoded data flow DATIN received by the input/output device 60. Particularly, the hardware accelerator 70 is configured to receive activation signals by the central processing unit 40 to decrypt the data flow DATIN and to send decrypted data DAT to an audio/video decoder 80 (AU/VID) adapted to provide (under the control of the central processing unit 40 to which it is operatively connected) the encoded data flow DATOUT to the television apparatus 20.

The audio/video decoder 80 comprises the rendering graphics module 500 or simply graphics module, already mentioned before, which results to be operatively connected to and controlled by the central processing unit 40.

The graphics module 500 is configured to implement a set of functions of the graphics type to render a 2D graphics scene, the description of which is received in input by the encoding/decoding apparatus 100 through the outer antenna 10, then displayed on the display screen 30 of the television apparatus 20, optionally overlapping the 2D graphics scene obtained with the encoded data flow DATOUT, sending the result to the television apparatus 20.

Preferably, the graphics module 500 is a graphics engine configured to render digital images by relieving the central processing unit 40 of additional working loads. To the purposes of the present disclosure, by graphics engine is meant a device capable of hardware and/or software rendering, not by means of the performance by the central processing unit, but through the performance by another co-processor such as, for example, a digital signal processor DSP. The terms "graphics accelerator" or "graphics co-processor", also usually employed in the computerized graphics field, are completely equivalent to the term graphics engine.

Alternatively, the graphics module 500 can be a graphics processing unit GPU, in which the rendering functions are performed on the basis of software instructions performed by a dedicated processor, such as a DSP, and on the basis of hardware instructions performed by a specifically designed hardware logic. In accordance with a further embodiment, some or all of the rendering functions are performed by the central processing unit 40.

Figure 2:
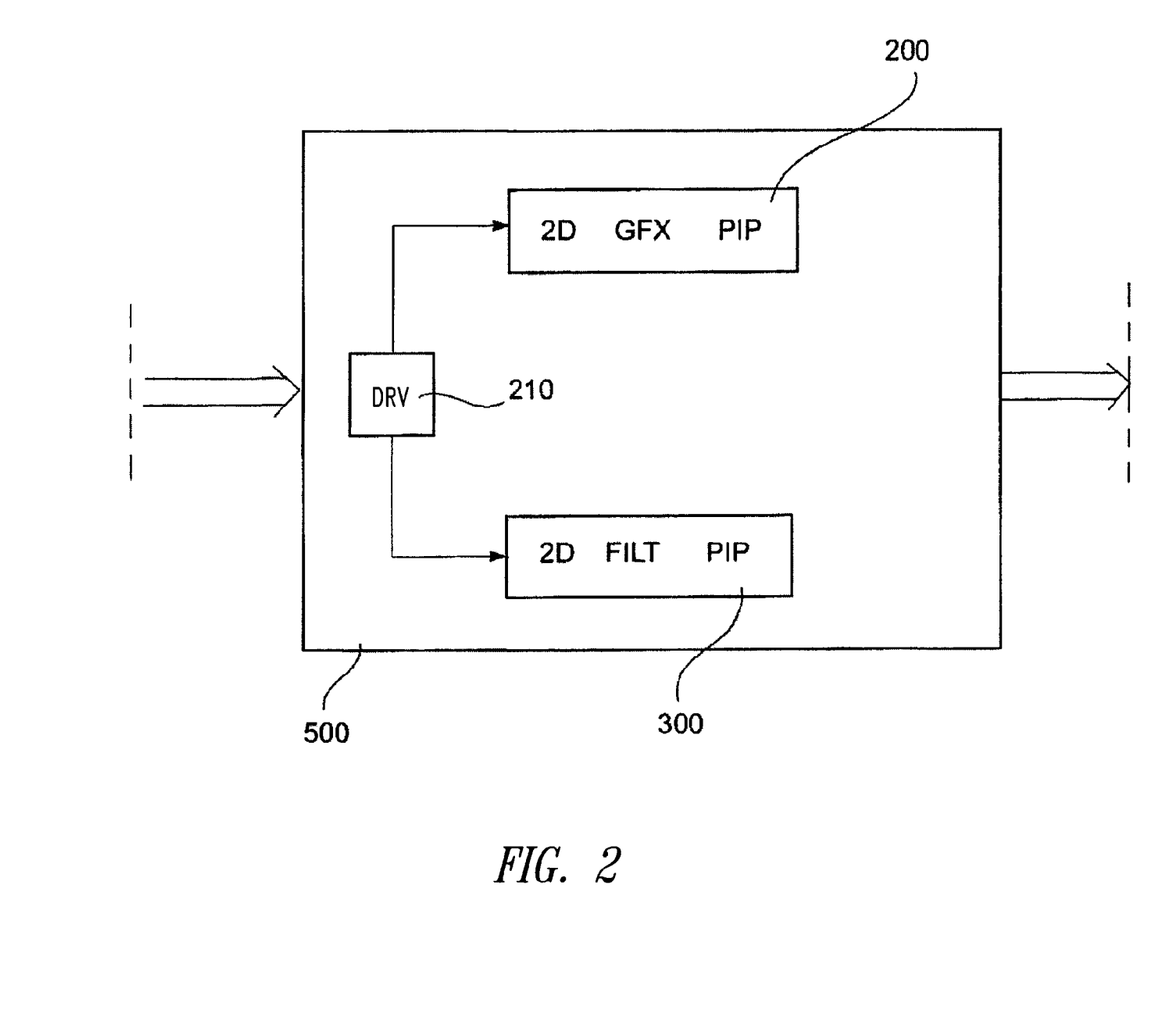
FIG. 2 schematically illustrates a graphics module according to an example of the disclosure.

FIG. 2 shows a block diagram of the graphics module 500. Particularly, the graphics module 500 is configured to render 2D (bidimensional) scenes on the display 30 of the television apparatus 20.

Particularly, the graphics module 500 in accordance with the example of the disclosure is intended to render 2D images based on a data processing approach in a so-called delayed mode. Furthermore, the graphics module 500 is preferably so configured as to result to meet the OpenVG open standard, promoted within a panel called Khronos, known in the literature.

By data processing through a delayed mode approach is meant a data processing comprising a first processing of the data received in input by the graphics module and the storing of the processed data in a memory internal to the graphics module and, following a special command received from the graphics application, a second processing intended to display the scene on the screen on the basis of the previously processed and rendered data. It is noted that in a delayed mode approach, the data are typically processed in a different order compared to that in which they are acquired by the graphics module, strictly depending on the graphics application.

It is noted that the processing of the data based on a delayed mode approach is known in 3D (three-dimensional) graphics and is at the base of the sort-middle rendering hardware architecture SMR, per se known to those skilled in the 3D graphics and also known as tile based rendering architecture.

In light of what has been stated above, by graphics module 500 is meant a graphics pipeline of the sort-middle type for the rendering of bidimensional scenes.

Now, with reference to FIG. 2, the graphics module 500 comprises a drive or driver module 210 (DRV), a first 2D graphics (GFX) pipeline 200, hereinafter graphics pipeline, and a second 2D filtering pipeline 300, hereinafter filtering pipeline.

The driver module 210 is a driver module in compliance with the OpenVG (OpenVG Driver) 2D standard, per se known, having standard interface tasks and configured to receive commands from programs (for example, Application Programming Interface, API) running on the central processing unit 40 and to translate said commands into specialized commands for the graphics pipeline 200 and/or the filtering pipeline 300.

The pieces of information which can be generated by the driver module 210 comprise: a reference 2D geometric entity (primitive) referred to as a path, hereinafter simply path; a context of a scene to be rendered, hereinafter simply context (particularly, the context organization reflects the one defined by the OpenVG standard); a reference digital (bitmap) image of the VG (Vector Graphics image) type, hereinafter simply VG bitmap image.

As it is known to those of ordinary skill in the art, a "path" is a reference geometric entity of the 2D graphics which is meant as a set of commands of the plotting type to be provided to the 2D graphics pipeline to define the stroke of a 2D bidimensional primitive. Particularly, a 2D scene can be defined as a set of VG bitmap images and paths to which one or more contexts are associated. Such set is sent to the graphics pipeline configured to compose, or better render the 2D scene on the display screen 30. Each path exploits a logic mechanism of the plotting type, which concretizes in plotting a stroke of the 2D primitive which is described by the path from a starting point to an endpoint.

To this aim, it shall be further noticed that a path complying with the OpenVG standard comprises a first command or segment array (data command or segment) representative of the graphics or movement to be plotted, and a second array of data representative of the X, Y coordinates of the endpoint in which the graphics or movement ends and, for some commands, representative of one or more control points, according to the particular command. It shall be noted that the starting point is to be considered as implicit: at the first command, it has coordinates equal to the conventional origin of the surface on which the graphics is to be plotted, and for the successive commands, it has, from time to time, revised coordinates and equal to that of the endpoint of the last performed command. The data of the second array are processed in parallel with the data of the first array according to the command defined therein.

The exemplary set of the main commands which can be indicated in a path comprises: MOVE TO, LINE TO, QUAD BEZIER TO, CUBIC BEZIER TO, ARC TO. The data corresponding to the endpoint coordinates are to be associated to each command.

For example, the path "command=MOVE TO; data=X1, Y1" implies a skip from the starting point or origin implicitly reached at the current stage of the computation (for example, with coordinates X0, Y0) to the endpoint with coordinates X1 and Y1. The command "MOVE TO" involves a shift on the surface, but it does not involve any stroke plotting on the same surface. The path "command=LINE TO; data=X1; Y1" involves plotting a line from the starting point (for example, the origin) to the specified endpoint (X1, Y1); the path "command=ARC TO; data=X, X1" involves plotting a segment of arc from the starting point to the endpoint (X1, Y1).

For example, the path "command=QUAD BEZIER TO; data=X1, Y1; X2, Y2" involves plotting a degree 2 Bezier curve (exactly, quadratic), passing between the starting point and the endpoint (X1, Y1). The datum X2, Y2 represents the control point, and it allows defining, for example, the particular shape of the Bezier curve to be plotted.

Referring back to the pieces of information provided by the driver module 210, by context is meant a set of instructions and/or pieces of information provided by the OpenVG 2D graphics application for the rendering of a scene, typically intended to the 2D graphics pipeline. Some instructions typically included in a 2D context are, for example: instructions intended to the processing module path, i.e., path fill, path stroke width; type of perspective transformation to be associated to the processing path module; paint type; anti-aliasing type; type of associated VG bitmap image; type of blending equation, and so on.

Finally, the piece of information of the VG bitmap image type, by which is meant a set of adjacent pixels, each having a given color, also results to be generable by the driver module 210. The bitmap image is such as to be received in input by the 2D graphics pipeline 200 and to be plotted (rendered) directly on the screen following a mapping operation, optionally a perspective one.

Referring back to the graphics module 500 of FIG. 2, it shall be noted that the graphics pipeline 200 is so configured as to receive from the driver module 210 pieces of information such as path, context, and VG bitmap images, and a further DRAW PATH or DRAW IMAGE command, which indicates to the same pipeline whether the entity to be processed is a path or a VG bitmap image.

Instead, the filtering pipeline 300 is so configured as to receive from the driver module 210 only context and VG bitmap images. Unlike the graphics pipeline 200, therefore, the filtering pipeline 300 is not arranged to receive in input geometric entities of the path type.

It shall be pointed out that, as it will be reaffirmed also herein below, the 2D graphics pipeline 200 is internally configured to process path-type entities, and not VG bitmap images; therefore, in the case that the entity to be rendered is exactly a VG bitmap image, the driver module 210 is configured to transform the VG bitmap image into an equivalent path. Particularly, the VG bitmap image is preferably transformed into four commands (particularly of the LINE TO type), the path of which will represent exactly the outer edge (stroke) of the VG bitmap image to be plotted.

This transformation, which can be performed by the driver module 210, advantageously allows a user not having to necessarily provide a path corresponding to the VG bitmap image, but to be able to directly provide bitmap images to the graphics module 500 by preferably prearranging only one driver module both for the graphics pipeline 200 (prearranged to accept both path and VG bitmap images) and for the filtering pipeline 300 of the graphics module 500 (prearranged to accept only VG bitmap images).

Figure 3:
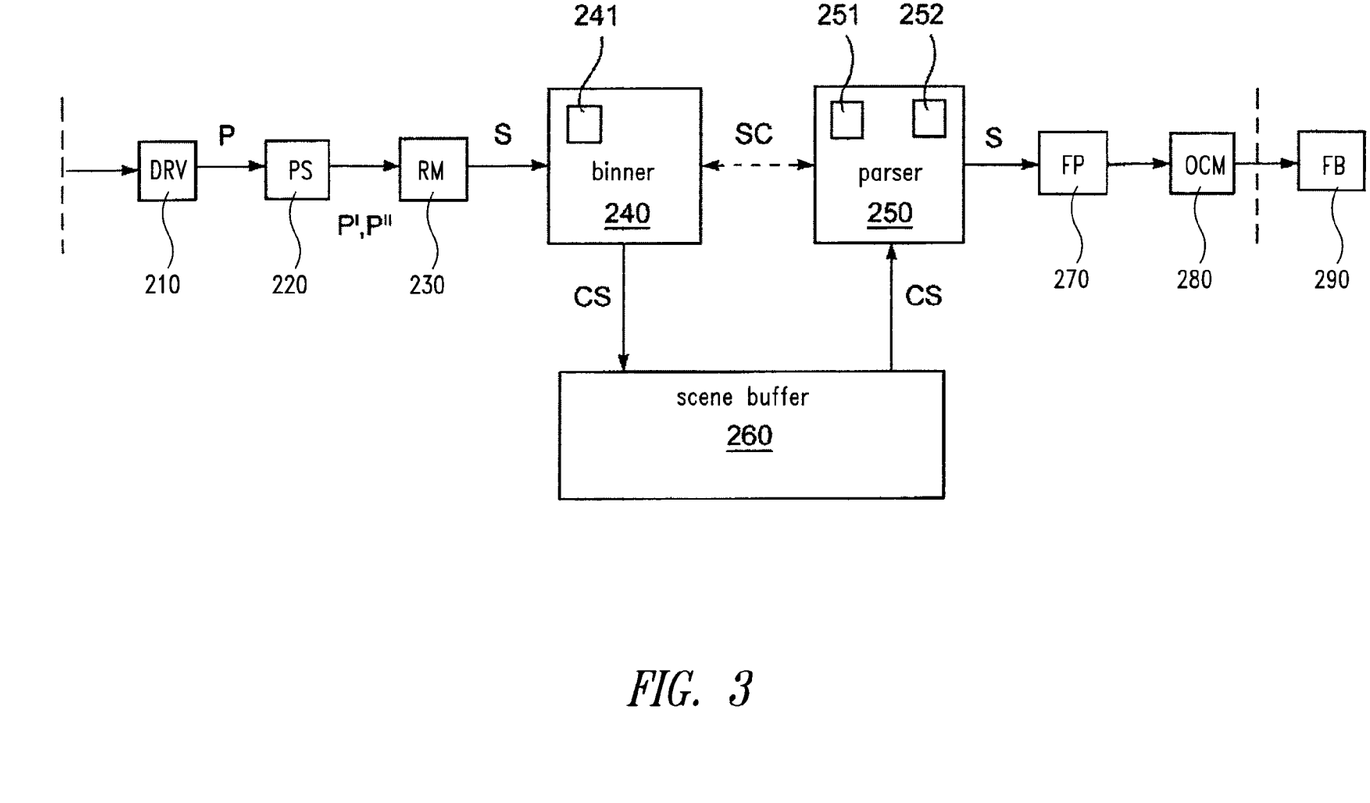
FIG. 3 illustrates a graphics pipeline which can be used within the graphics module of FIG. 2 according to an exemplary embodiment of the disclosure.

With reference now to FIG. 3, the graphics pipeline 200 will be now described in detail.

The graphics pipeline 200 comprises a path stage 220 (PS), a rasterizer module 230 (RM), a first processing module 240 (binner), a second processing module 250 (parser), a scene buffer 260, a fragment processor 270 (FP), a macro-block memory module 280 (OnChip memory, OCM), a frame buffer 290 (e.g., of the display 30).

The path stage 220, per se known to those skilled in the 2D graphics art, is so configured as to receive in input an input path P from the driver module 210 (shown for the sake of clarity also in FIG. 3) and to provide a simplified output path P' to the rasterizer module 230. The input path P results to be a so-called high-level path, since it comprises all the possible commands (described before) which a path can define. The output path P' results to be a so-called low-level path and, as stated, simplified compared to the input path P, since it comprises only commands of the MOVE TO or LINE TO type. The simplified path P' is usually also referred to as edge, hereinafter also simply EDGE.

It shall be noted that, preferably, the path stage 220 is, in turn, a micro-pipeline comprising a series of processing modules (not shown in FIG. 3), each of which is configured to concur to the generation of the simplified output path P' starting from the input path P according to the context provided by the driver module 210.

For example, the path stage 220 comprises a per se known tessellator module so configured as to transform the input path P into the output path P'. The output path P' also comprises a series of commands (typically implicit) of the plotting type (only LINE TO, MOVE TO) with the data being associated to data representative of surface or screen coordinates. By surface coordinates is meant coordinates which can be mapped directly into pixels on the screen.

It shall be noted that the path stage 220 is so configured as to process the input path P as a function of the instructions included in the context provided by the driver module 210, for example, a path fill instruction or a path stroke width instruction. Both the instructions indicated above are well known to those of ordinary skill in the field.

Particularly, if the context comprises the path fill instruction, the path stage 220 results to be prearranged to provide the output path P' to the rasterizer module 230 as generated by the tessellator module, since the path fill operation is performed by the rasterizer module 230. Instead, in the case where the context comprises the path stroke width instruction, the path stage 220 results to be intended to perform a path P' width operation on the output path P' generated by the tessellator module, by means of convolution and width operations on the basis of a piece of information about the width provided by the context in combination with the path stroke width operation. In this scenery, the path stage 220 results to be arranged to provide a further output path P''' to the rasterizer module 230 as a result of the output path P' width.

Therefore, the path stage 220, according to the instructions contained in the context, results to be configured to provide the stroke type (P' or P''') on which the fill operation is to be performed to the rasterizer module 230. Furthermore, the path stage 220 results to be arranged to carry out, for example, a path projection operation on the final screen through a transformation matrix.

The rasterizer module 230 is a 2D AET (Active Edge Table Rasteriser) rasterization module, per se known, which results to be operatively associated to the path stage 220 and so configured as to receive therefrom the simplified output path P' or the further output path P''' (EDGE in surface or display coordinates) and to provide in output generally more low-level graphics entities of the span S type, hereinafter simply referred to as spans.

As it is known to those of ordinary skill in 2D graphics, by "span" is meant a set of horizontally adjacent fragments of the screen having the same coverage compared to the simplified path (P' or P''') in input from the rasterizer module 230. By fragment is meant a set of pixel pieces of information comprising a set of attributes for each pixel, such as, for example, color and coordinate values. By coverage is meant the percentage of fragment overlap compared to the simplified path (P' or P'''). The coverage value, or coverage, is defined as a number ranging between 0 and 1.

A fragment completely included within the path has a total overlap relative to it, therefore a coverage percentage of 100% (by definition, coverage value=1). Instead, a fragment which is at the level of the path (P' or P''') stroke has, compared to it, a partial overlap, therefore a coverage percentage below 100% (by definition, coverage value<1).

Figure 4:
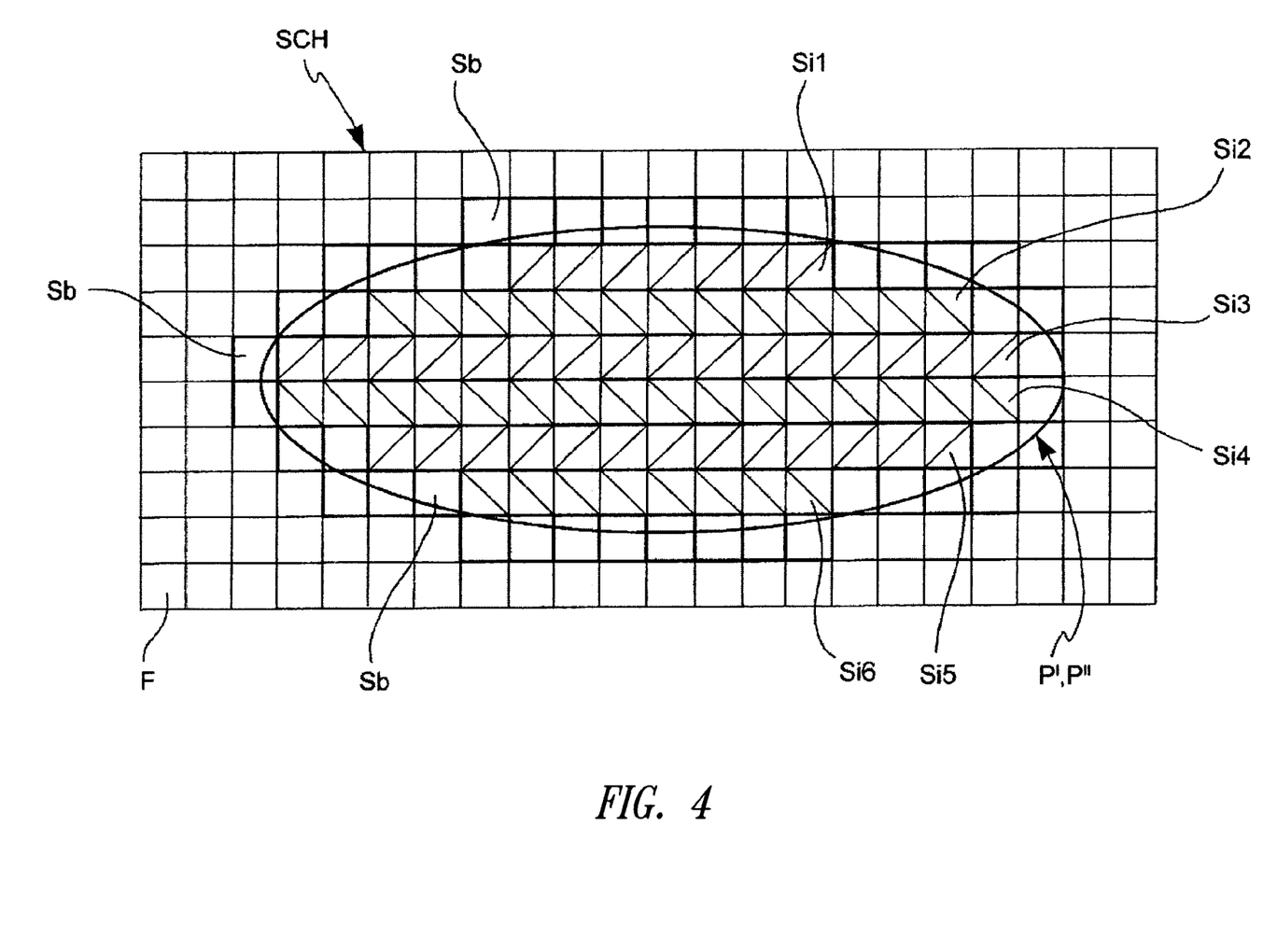
FIGS. 4 and 6 schematically illustrate embodiments of display screens on which reference graphic entities processed by the graphics pipeline of FIG. 3 are represented.

With reference to FIG. 4, an example of span generation by the rasterizer module 230 will be now described. A display screen SCH, for example, the display 30 of the television apparatus 20, is illustrated as being divided into a plurality of fragments F. The rasterizer module 230 is so configured as to generate a plurality of spans by grouping adjacent fragments having the same coverage value on the basis of the assessment of how many fragments are partially or completely overlapped to a simplified path (P'; P'') received from the path module 220. In the example of FIG. 4, the simplified path is an ellipse (typically described at a high level as a path P consisting in two commands of the arc type). It is reaffirmed that the rasterizer module 230 is not configured to receive in input an ellipse as such, represented directly by the path P, but a simplified path P' (EDGE), i.e., a set of rectilinear segments representative of an approximation of the ellipse.

The spans which can be generated by the rasterizer module 230 can be of two types: internal span, i.e., a set of mutually adjacent fragments internally overlapped to the ellipse (coverage value equal to 1); border span, i.e., a set of adjacent fragments partially overlapped to the ellipse (same coverage value less than 1). It is pointed out that in the case of an elliptical-shaped path, it is very unlikely that border spans comprising more than an individual fragment are generated.

In the example of FIG. 4, six internal spans can be identified (si1, comprising 7 fragments; si2, comprising 13 fragments; si3, comprising 16 fragments; si4, comprising 16 fragments; si5, comprising 13 fragments; si6, comprising 8 fragments), and forty-three border spans (some of them being indicated with the reference sb), each comprising an individual fragment.

The rasterizer module 230 is arranged to define the span-type primitive through a data set comprising: a first datum YLINEA representative of the screen line to which the span belongs; a second datum XSTART representative of the column in which the first span fragment is located; a third datum SIZE (width) representative of the span size in terms of the number of adjacent fragments starting from the second datum XSTART. With reference to the first internal span si1 of FIG. 4, it results to be defined by the rasterizer module 230 with the data set YLINEA=3; XSTART=9; SIZE=7.

Again, with reference to FIG. 3, the first processing module 240 is so configured as to clip the span-type input primitive received from the rasterizer module 230 into sub-span type primitives, each of which is associated with a macro-block of the display screen SCH.

Particularly, the first processing module 240 is arranged to know, from the context provided by the 2D graphics application, a piece of information representative of the size of each macro-block into which the display screen on which the scene is to be rendered is able to be clipped.

By definition, a macro-block is a screen portion having size N×M, where each of N and M (preferably powers of two) represents a number of pixels preset by the context of the 2D graphics application. The N×M macro-block size is to be considered as fixed, since it is a static characteristic of the end hardware architecture (graphics system) to which the graphics module 500 is intended.

Contextually to the span-type input primitives and the size of a macro-block, the binner module 240 is so configured as to receive a piece of information relative only to the sub-context of the fragment processor 270.

The first processing module 240 results to be configured to store in the memory buffer 260 the pieces of information relative to the sub-span type primitives and the relative sub-context on the basis of the acquired size of the individual macro-block according to an organization of the memory area corresponding to the memory buffer 260 defined by a specific data structure which will be discussed herein below.

Particularly, the first processing module 240, once the piece of information indicative of the size N×M of the individual macro-block has been acquired, is so configured as to generate a data structure of the display list type associated to each macro-block of the scene to be rendered, such as to organize the data storage within the scene buffer 260 in a compact manner, therefore in a particularly advantageous manner.

Figure 5:
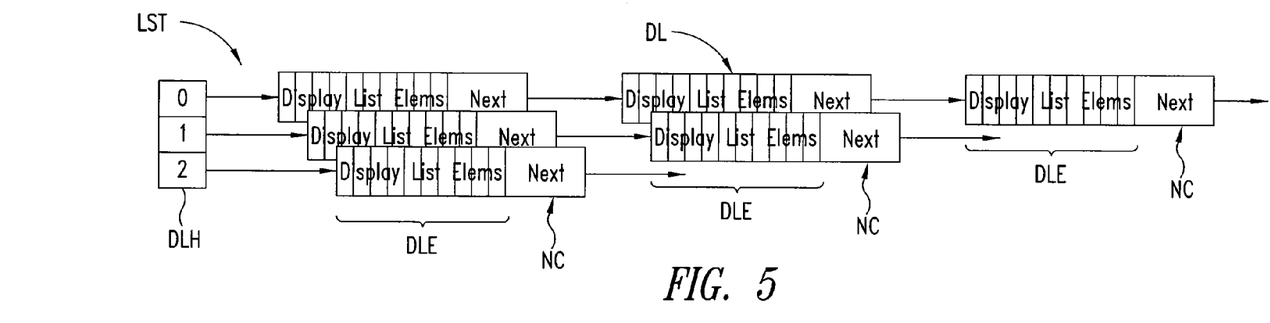
FIG. 5 schematically illustrates an organization example of an internal memory buffer relative to the graphics pipeline of FIG. 3.

An example of a list-type data structure, indicated with the reference LST, is shown in FIG. 5. The list-type data structure LST is preferably a dynamic array of the scene buffer 260 comprising an array of display list headers DLH and a plurality of display lists DL arrays. Each display list array of the plurality DL is organized in mutually concatenated memory portions or chunks of a fixed size.

Each element of the array of display list headers DLH represents an address of a memory portion of the scene buffer 260 in which the first portion of the display list DL is included.

The array of display list headers DLH is typically allocated in an initial portion of the memory area corresponding to the scene buffer 260. The number of elements D of the header array, representative of the length of the array of display list header DLH, is computed by the first processing module 240 by implementing the following relationship:

$$D=\text{ceiling}(W/N) \times \text{ceiling}(H/M) \quad (1.0)$$

As defined by the relationship (1.0), the value D is as a function of the dimensions of the individual macro-block (N×M) and the resolution of the display screen (W×H). It shall be noted that the screen resolution (W×H) is to be intended as the current resolution of the screen at the moment when the first processing module 240 implements the relationship 1.0. In fact, the screen resolution could vary in accordance with the rendering surface associated to the graphics pipeline 200 in particular moments of the computation. As regards the computation as such, it is pointed out that the command "ceiling" represents a rounding up to the nearest higher integer compared to the division operation indicated in brackets.

By way of example, by supposing that the macro-block has a fixed size equal to (64×32) and the graphics pipeline 200 is configured to render a scene on a screen having a current size equal to (800×600), the number of elements of the array of display list header array (therefore, also the display list number) is equal to D=ceiling(800/64)×ceiling(600/32)=13×19=247.

As regards an individual display list, each portion of a display list comprises a fixed number of list elements DLE (in the example of FIG. 5, equal to 10) and a pointer NC to the memory address of the scene buffer 260 in which the display list portion of the same display list is allocated. The first processing module 240 is so configured as to associate the newly generated display list portion to the pointer NC of a display list portion preceding the memory address of the scene buffer 260 in which it is allocated. This type of organization is dynamic, since, advantageously, in the case where a display list DL is complete, the first processing module 240 is so configured as to generate a new display list portion to be successively concatenated to the last generated display list portion.

This organization of the scene buffer into concatenated display list portions allows the first processing module 240 to efficiently store display lists, since it is possible to load the display lists from an external memory (not shown in the Figures) into a local buffer (scene buffer).

A display list element DLE is, for example, a 32-bit data structure in which the most significant 4 bits are representative of an operative code (to a maximum of 16 different operative codes definable), while the remaining 28 bits are representative of semantics in accordance with the operative code which they are associated to.

It shall be noted that the type of operative code discriminates the type of display list element. For example, in the case where the operative code is a pointer to a memory address in which a given context which had been previously stored is allocated, the remaining 28 bits are used to store the above-mentioned memory address. According to another example, the operative code can indicate a sub-span type primitive (clipped span), and the remaining 28 bits are used to store data relative to the sub-span. Another example of an operative code can be relative to the encoding of a per se known macro-block masking operation. In this case, the remaining 28 bits indicate the type of masking operation. Other examples of operative code can be memory buffer or macro-block clearing operations. In this case, the 28 bits indicate the relative memory area to be cleared.

Furthermore, the first processing module 240 is configured, following the generation of the data structure of the display list type, to store a sub-context associated to the instruction "DRAW", which it can receive from the graphics application through the driver module 210.

It shall be noted that the very sub-context to be stored in the scene buffer is the one which can be associated to the individual fragment processor 270.

Furthermore, it shall be considered that, since a same sub-context can be shared by different span-type input primitives, it is stored in the scene buffer 260 only once, and it is associated to each span-type primitive by using a respective display list element of the display list structure comprising a pointing operative code and an address of the scene buffer memory area in which the shared sub-context is allocated.

It shall be further noticed that the sub-context associated to the fragment processor 270 is provided by the OpenVG specifics; therefore the maximum size thereof is a piece of information known a priori to the 2D graphics pipeline.

Referring back to the first processing module 240, it comprises a first local write memory buffer 241 to locally store the sub-context.

The first processing module 240 is advantageously configured to locally store (in a compact representation thereof) the sub-context in the first local write memory buffer 241 and, subsequently, once the sub-context has been locally acquired, to transfer and store the sub-context in the scene buffer 260 through an individual access to an external memory. The use of the local write memory buffer 241 is advantageous, since the context size is not known a priori.

It shall be noted that the size of the compacted sub-context may vary as a function of the values of the same context. In fact, as it is known, in the OpenVG standard, a path or a VG bitmap image can be rendered with the addition of several options such as, for example, the definition of a specific image for a particular primitive.

Contextually, the first processing module 240 is arranged to store a memory address in an internal register of its own (not shown in the Figures), which is representative of the scene buffer memory area in which the sub-context is stored. Furthermore, the first processing module 240 is configured to associate this address to each span which it will receive from the rasterizer module.

In addition, it shall be noted that the first processing module 240 is intended to first acquire the sub-context, and next the span-type primitives. This advantageously allows to the first processing module 240 associating the reference sub-context to each span-type input primitive, and storing this piece of information in each of the display lists of each macro-block intersecting the span-type input primitive.

It is reaffirmed that the first processing module 240 is so configured as to receive from the rasterizer module 230 the span-type input primitives generated in accordance with the path-type primitive to be rendered. Particularly, such span-type input primitives are sent to the first processing module 240 according to an increasing line order (from the i-th line to the i+1-th line).

Figure 6:
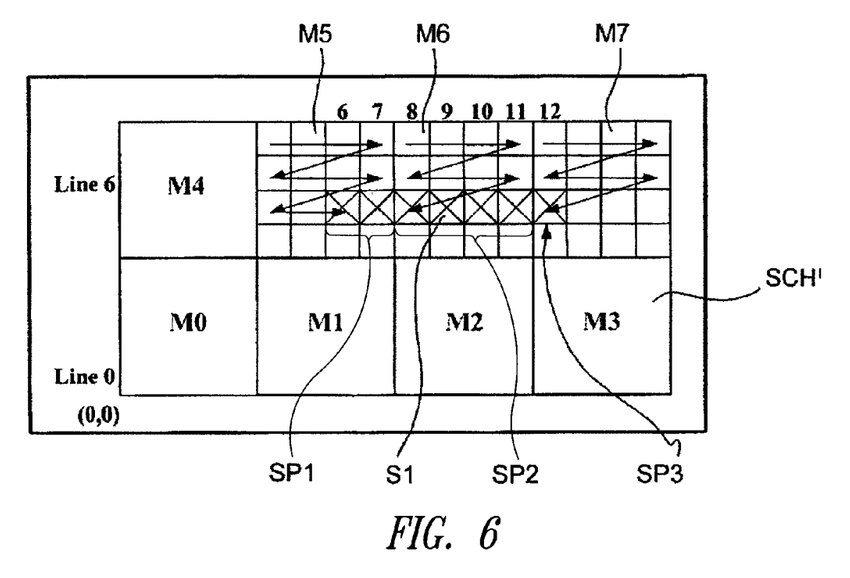

With reference now to FIG. 6, it shall be considered, for example, a portion of the display screen SCH' divided into eight macro-blocks M0-M7, each of which is of size 4×4. It is reaffirmed that the size of the individual macro-blocks is fixed, since it is defined a priori at the system level, and it is expressed in numbers of fragments.

The first processing module 240 is so configured as to conventionally associate the coordinates 0, 0 at the lower left hand corner of the screen SCH' portion, and to associate to each line of screen fragments a progressive reference numeral, starting from the bottom (line 0, . . . , line 4, line 5, line 6, . . . ), and to each column a progressive index, starting from the left ( . . . , 6, 7, . . . , 11, 12, . . . ).

Upon receiving the span-type input primitive S1, the first processing module 240 is so configured as to clip the span-type input primitive S1 into one or more sub-span type primitives (hereinafter, for the sake of briefness, simply sub-spans) in accordance to the relevant macro-blocks which the span-type input primitive overlaps.

By definition, a sub-span type primitive is a portion of a span-type primitive univocally associated to one and only one macro-block of the display screen, and the pieces of information referred thereto are inserted within the display list structure associated to such macro-block.

With reference to FIG. 6, since the span-type input primitive s1 overlaps a first macro-block M5, a second macro-block M6, and a third macro-block M7, the first processing module 240 results to be adapted to clip the input span S1 into a first sub-span SP1 defined within the first macro-block M5, a second sub-span SP2 defined within the second macro-block M6, and a third sub-span SP3 defined within the third macro-block M7.

Consequently, the first processing module 240 is so configured as to store the pieces of information relative to the first sub-span SP1 within the display list data structure associated to the first macro-block M5, the pieces of information relative to the second sub-span SP2 within the display list data structure associated to the second macro-block M6, the pieces of information relative to the third sub-span SP3 within the display list data structure associated to the third macro-block M7. The operations implemented by the first processing module 240 to organize the display list data structure so as to store the sub-spans will be described herein below.

Furthermore, the first processing module 240 is arranged to store in each display list data structure associated to the respective macro-block, before the storing of the pieces of information of the corresponding sub-span, also a reference (pointer or memory address) to the compacted sub-context of the fragment processor 270.

As regards the storing of a sub-span within the respective display list data structure, it shall be considered that a sub-span represents a display list element. Particularly, the 28 bits dedicated to the data of the display list element in the case of sub-spans can be organized, for example, as follows:

s bits dedicated to store a sub-span size value (in the example of FIG. 6, is equal to 13 bits);

28-s bits dedicated to store a sub-span offset value. By sub-span offset is meant the distance in terms of the fragment number of the first fragment of the sub-span from the relative origin of the individual macro-block (conventionally, the fragment at the higher left hand corner of the macro-block).

With reference again to the example of FIG. 6, it is pointed out that the XSTART, YLINEA, and SIZE data set of the span-type input primitive S1 are indicated with reference to the coordinates of the whole screen. Thereby it follows that, being XSTART equal to 6, YLINEA equal to 6, and SIZE equal to 7, the input span S1 has a starting point of screen coordinates (6, 6) and an endpoint of screen coordinates (12, 6). It is reaffirmed that, conventionally, the origin of the coordinate system is the lower left hand corner.

On the basis of these pieces of information, the first processing module 240 is so configured as to compute an identifier IDP of the screen macro-block which includes the starting point of the span S1, and an identifier IDA of the screen macro-block including the endpoint of the span S1 by implementing the following relationship:

$$ID=(Y/M) \times NML+(X/N) \quad (1.1)$$

in which ID represents the identifier to be computed; N×M represent the macro-block dimensions; (X, Y) are the coordinates of the starting or endpoint of the span the containing macro-block identifier of which is to be computed; NML is the number of macro-blocks per line (in the example of FIG. 6, equal to 4).

In the example of FIG. 6, the identifier IDI of the macro-block (having size 4×4) including the starting point (with coordinates 6; 6) of the span S1 is computed by implementing the relationship (1.1) as follows:

IDI=(6/4)×4+(6/4)=5→the starting point of the span S1 is contained in the macro-block M5 (see FIG. 6).

The identifier IDF of the macro-block including the endpoint (with coordinates 12; 6) of the span S1 is calculated by implementing the relationship (1.1) as follows:

IDF=(6/4)×4+(12/4)=7→the endpoint of the span S1 is contained in the macro-block M7 (see FIG. 6).

Once the identifier of the macro-block (M5) which includes the starting point of the span S1 and the identifier of the macro-block (M7) which includes the endpoint of the span S1 have been calculated, the first processing module 240 knows all the macro-blocks which include the input span S1 (in the example of FIG. 6, the macro-blocks M5, M6 and M7).

The first processing module 240 is arranged to organize the scene buffer according to a display list-type data structure associated to each of the above-mentioned macro-blocks. Particularly, the pieces of information relative to the memory address in which the sub-context is stored and relative to the sub-spans are stored in the display lists which start from the macro-block including the span S1 starting point and which end at the macro-block including the span S1 endpoint. Furthermore, for each sub-span in which the input span S1 is divided, the display list data structure will have to be filled with list elements representative of the size value and the offset value of the corresponding relevant sub-span.

Therefore, it shall be observed that for each macro-block to which the input span S1 is overlapped, the first processing module 240 is so configured as to create and store a sub-span in the display list data structure associated to a macro-block intersected by the input span S1.

As stated above, a sub-span can be identified by means of the size value and the offset value.

To the purpose of the computation thereof, the first processing module 240 is arranged to implement the following relationships:

$$\text{offset}=(Y\%M) \times N + X\text{start}\%N \quad (1.2)$$

in the case where the macro-block identifier ID is the same as the identifier IDI of the macro-block including the input span starting point; in the opposite case, the value 0 is assigned to the offset value;

$$\text{offsetEnd}=(Y\%M) \times N + X\text{end}\%N \quad (1.3)$$

in the case where the macro-block identifier ID is the same as the macro-block identifier IDF including the input span endpoint; in the opposite case, the value (N−1) is assigned to the offsetEnd value. The offsetEnd value indicates the sub-span last fragment calculated in fragment numbers starting from the origin of the individual macro-block;

$$\text{size}=\text{offsetEnd}-\text{offset}+1 \quad (1.4)$$

In the relationships (1.2) and (1.3), N and M are the dimensions of the individual macro-block; Xstart is the coordinate X of the input span starting point; Xend is the coordinate X of the input span endpoint; the symbol "%" indicates the remainder of the internal division.

In the example of FIG. 6, what has been indicated herein below is achieved by applying the relationships (1.2), (1.3), and (1.4):

offset(SP1)=(6%4)×4+(6%4)=8+2=10;
size(SP1)=((6%4)×4+3)−10+1=11−10+1=2
offset(SP2)=(6%4)×4+0=8+0=8
size(SP2)=((6%4)×4+3)−8+1=11−8+1=4
offset(SP3)=(6%4)×4+0=8+0=8
size(SP3)=((6%4)×4+0)−8+1=8−8+1=1

In the case where the input span S1 is a so-called border span, the respective of coverage is added at the bottom of the display list, following the pieces of information relative to the operative code, the offset value and the size value of the sub-span. Therefore, a border span requires at least 64 bits of information to be stored. Instead, in the case of an internal span, it only requires 32 bits of information, as already stated before, since, as it is an internal span, the coverage value thereof is implicitly defined as equal to 1.

The first processing module 240, by implementing the relationships (1.2), (1.3), and (1.4), is so configured as to compute the data and to store in a compact manner all the input spans received in a sub-span representation (clipped span).

To the purposes of the present description, the general compaction operation performed by the first processing module 240 involves the input span clipping operation into sub-spans and, for each of them, the computation of the offset value and the size value.

In a further embodiment of the disclosure, the first processing module 240 is so configured as to pre-process some steps of a culling algorithm of sub-span type primitives which is mainly implemented, as it will be described in detail herein below, by the second processing module 250. This pre-processing is possible since the context set by the graphics application is already known at the level of the first processing module 240, therefore it is possible to determine if an input span is of the occluded or occluding type. By definition, a border span (coverage value<1) cannot be considered of an occluding type.

In the case of an internal span (coverage value=1), if particular setting conditions of the context are not contextually verified, the internal span is to be considered as a non-occluding span. Instead, in the case that said conditions are verified, the internal span is to be considered as of the occluding type.

The above-mentioned conditions relative to the sub-context of the fragment processor and relative to the span are, preferably, as follows:

blending equation (per se known) set to "VG_BLEND_SRC";

Vgmasking (per se known) disabled;

coverage value of the span equal to 1 (this condition confirms that no border span will be able to be considered as occluding).

If the above-mentioned conditions are verified, the span is marked as occluding, for example, by using one of the 16 operative codes available in the display list data.

In practice, a span can be marked as occluding only in the case where the color of a span fragment completely overwrites any other colors previously stored in the internal frame buffer.

The marking as occluding or non-occluding of a span advantageously allows to the graphics pipeline 200, once the command SHOW has been received from the graphics application, processing what has been captured and stored in the scene buffer by the first processing module 240, displaying only the occluding spans and not the occluded ones since they are hidden.

Figure 7:
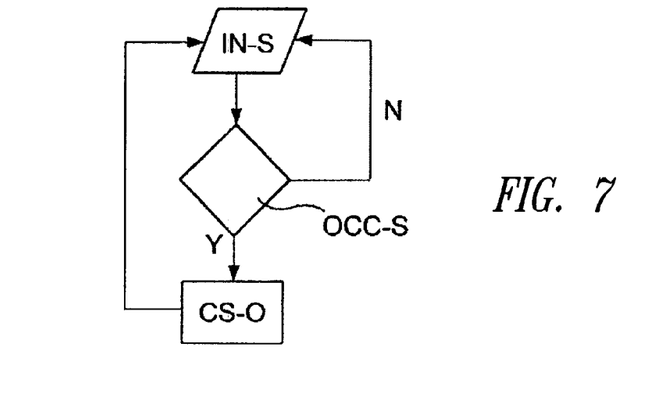
FIGS. 7 and 8 schematically show block diagrams representative of the main operations performed by a processing module of the graphics pipeline of FIG. 3.

With reference now to the block diagram of FIG. 7, a pre-processing example of a culling algorithm by the first processing module 240 is now schematically summarized.

The first processing module 240 is configured to: receive an input span (step IN-S) and to control whether the received input span is occluding (step OCC-S). Particularly, it is pointed out that at the moment of the storing of the sub-context of the fragment processor in the scene buffer, in the case where the two context conditions indicated before are verified (blending equation set to "VG_BLEND_SRC" and Vgmasking), a flag is also stored which is equal to the value TRUE, to indicate that the span which is being processed could be an occluding span in the case the internal span condition is verified (coverage value equal to 1). The third condition is computed upon storing the span in the scene buffer.

In the case of an affirmative answer (step OCC-S), the input span is marked as occluding (step CS-O), and the first processing module is ready to receive the successive input span. On the contrary, in the case of a negative answer, the first processing module prepares itself for receiving a new input span.

Figure 8:
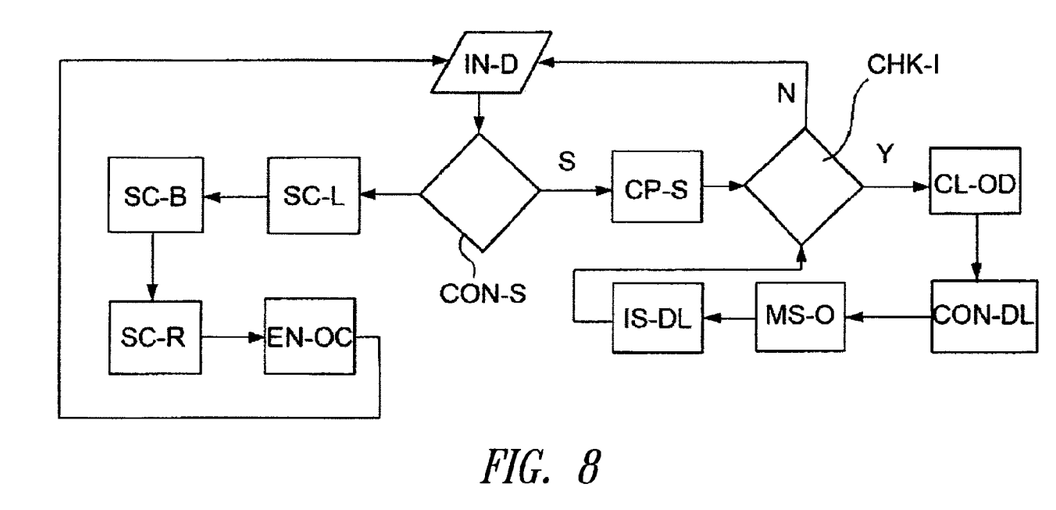

With reference to FIG. 8, the flow of operations implemented by the first processing module 240 (except for the operations relative to the pre-processing of the culling algorithm) is now schematically summarized.

The first processing module is so configured as to receive an input datum (step 1N-D) and to control whether the input datum is a scene context (sub-context of the fragment processor) or an input span (step CON-S).

In the case where the input datum is a context, the first processing module 240 is intended to store the context in the first local write buffer 241 (step SC-L) and then in the scene buffer 260 (step SC-B). Then, the first processing module 240 is so configured as to store the address of the memory area in which the context is stored (step SC-R) in a special register. As a final operation, it is also controlled whether the context provides for the enabling of the culling algorithm (step EN-OC) before returning to process the successive input datum (step 1N-D).

Instead, in the case where the input datum is a span-type primitive, the first processing module 240 is so configured as to clip the input span into sub-span type primitives, in accordance with the macro-blocks of the display screen which are overlapped by the input span (block CP-S). Then, a control is performed, to determine whether or not a sub-span is to be stored in the scene buffer 260 (block CHK-I). In the case where the sub-span is not to be stored, then the first processing module 240 prepares itself for receiving a successive input datum (block IN-D). In the case where the sub-span is to be stored, then the first processing module 240 proceeds to calculate the sub-span offset value and size value by implementing the relationships (1.2)-(1.4) (block CL-OD). The offset and size values are inserted in the display list of the macro-block in which the sub-span is included, contextually to the memory address in which the (previously processed) sub-context (block CON-DL) is stored. Then, if the sub-span flag is equal to the value TRUE and the sub-span has a coverage value equal to 1, then the sub-span is marked as an occluding sub-span (block MS-O). Next, the sub-span is inserted in the respective display list (block IS-DL) and the first processing module 240 prepares itself for receiving the successive input datum (block CHK-I, block IN-D).

Again, with reference to FIG. 3, the second processing module 250 results to be operatively associated to the scene buffer 260 to share upon reading what has been written by the first processing module 240. It shall be noted that the first 240 and the second 250 processing modules also share per se known synchronism signals SC.

Particularly, the first processing module 240 is so configured as to capture the data relative to the context (or sub-context) of the scene to be rendered and the data relative to the span-type primitives as received from the rasterizer module 230 and to store them in a compact representation (sub-span associated to respective macro-blocks of the screen).

The second processing module 250 is so configured as to perform the opposite or dual role relative to that of the first processing module 240. Particularly, reading the data stored in the scene buffer 260 and, proceeding according to a given order for the macro-blocks, to re-set the sub-context of the fragment processor and to identify the spans stored therein.

Furthermore, the second processing module 250 is advantageously configured to implement an occluded primitive culling algorithm in order to reduce, as it will be also reaffirmed herein below, the working load of the fragment processor.

It shall be noted that the data processing by the second processing module 250 begins when the graphics application, through the driver module 210, provides the command to show the rendered scene (command SHOW) on the screen to the graphics pipeline 200. Contextually to the command SHOW, further commands can be provided, as provided for by the OpenVG standard, which indicate to proceed with the empty of the graphics pipeline 200 (processing of the data stored within the scene buffer).

It shall be noted that, as it is known, a sort-middle graphics pipeline is configured for a real processing of the data of the previously captured scene only upon reception of one of the above-mentioned commands from the graphics application.

It shall be further considered that, since each macro-block into which the display screen can be clipped is independent from the other macro-blocks, the modules of the graphics pipeline 200 downstream the first processing module (for example, the second processing module 250, the fragment processor 270, the macro-block memory module 280) are advantageously configured to operate in parallel.

Referring back to the second processing module 250, it comprises a second local write buffer 251 to store the i-th display list corresponding to the i-th macro-block read and withdrawn from the scene memory buffer 260 by the second processing module 250.

It shall be noted that, advantageously, in an alternative embodiment, it is possible to store a display list portion associated to the macro-block in the second local write buffer 251, thereby enhancing the performance of the graphics pipeline 200.

The second processing module 250 is further configured to load a current context of a macro-block region being processed by further external memory buffers relative to the second processing module (for example, an alpha-mask buffer and a frame buffer) in the macro-block memory module 280.

It shall be noted that in the above-mentioned further external buffers, data useful for the representation of the macro-blocks could be stored, such as, for example, background images previously processed by the filtering pipeline 300 (FIG. 2). In fact, typically, the graphics module 500 is advantageously prearranged to load the data processed by the filtering pipeline 300 before the graphics pipeline 200 proceeds to render the scene.

It shall be further considered that, for example, in the case where a per se known super-resolution-based anti-aliasing algorithm is used by the graphics application, the macro-block memory module 280 inside the graphics pipeline 200 is considered under super sampled resolution.

It is recalled that an anti-aliasing algorithm allows improving the displaying of the strokes of a scene so that the same strokes are as shaded as possible, and are not hatched. This is typically achieved by increasing the screen resolution during the processing of the data to be rendered. For example, this resolution increase can be equal to four times the screen resolution. In this case, the frame buffer has not the same resolution of the screen, but it is arranged to operate under super resolution. Therefore, the scene is rendered with reference to a larger screen (frame buffer under super resolution) and to the command show scene (SHOW) by the graphics application, each screen pixel (original resolution 1×) will have a color given by the average of the color of four pixels spatially organized in a 2×2 grid of the frame buffer (super resolution 4×). Therefore, the strokes of a scene will result to be shaded and not hatched, de facto increasing the quality of the scene displayed on the screen.

In the case that the anti-aliasing algorithm is enabled, a per se known up-sample filter (which is achieved by replicating the pixel color) is adopted when loading the data from the frame buffer. The application of the up-sample filter is necessary, since the data loaded from an external buffer always refer to the original resolution 1× (as large as the screen), while internally the internal macro-block memory module of the OnChip type refers to a super resolution (for example, quadruple or 4×). Therefore, the up-sample filter is arranged to replicate the color of one pixel loaded from an external buffer in four adjacent pixels of the internal memory module of the OnChip type.

Instead, in the case that the alpha masking function is disabled, or the alpha mask buffer is not used, the loading of macro-blocks with alpha mask could be omitted.

Again, in the case, for example, that a first instruction contained in the display list of a macro-block is full color clear, the loading of pieces of information from the external buffer can be omitted, since they will be in any event covered by this color.

The second processing module 250 is further configured to implement a culling algorithm of the primitives of the occluded span type stored within the display list being processed and relative to the loaded macro-block.

The second processing module 250 is simply intended as a filter adapted to determine whether the span is of the occluded type or not. To this aim, the second processing module 250 advantageously comprises a local bitmask buffer 252 having preferably size of N×M, i.e., equal to that of each macro-block. The local bitmask buffer 252 is a one-bit buffer that (i.e., at the beginning of the current macro-block processing) is initially supposed to be equal to zero.

The second processing module 250 is so configured as to process the display list in an inverse order since, due to the manner in which the display list has been written by the first processing module 240, the rule according to which the last span written in the display list is such as to overwrite all the preceding spans is to be considered as valid. Therefore, the second processing module 250 is arranged to process the display list relative to an individual macro-block, starting from the last display list element stored in the scene buffer 260 and ending with the first element stored therein.

Figure 9:
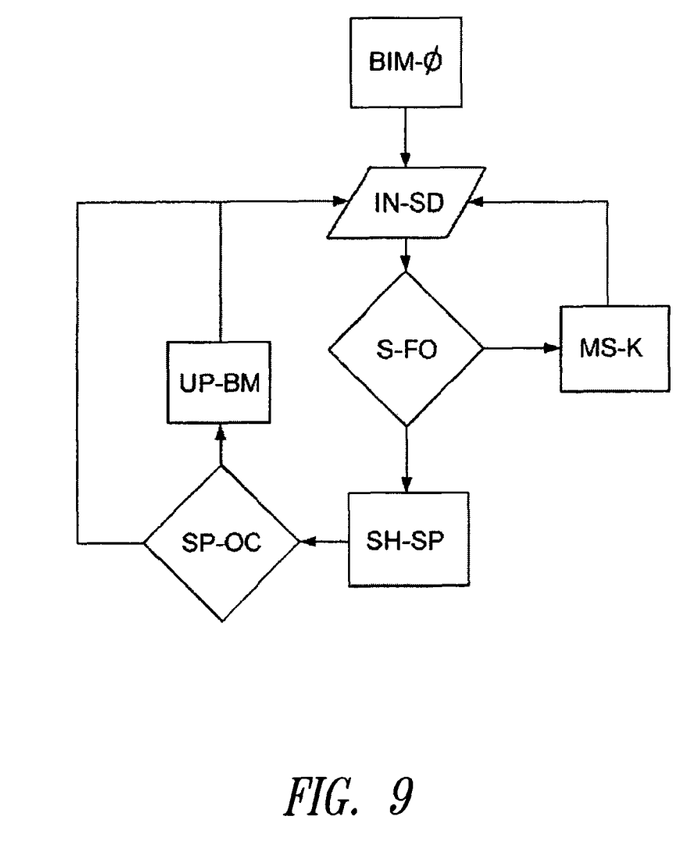
FIG. 9 schematically shows a block diagram representative of the main operations performed by a further processing module of the graphics pipeline of FIG. 3.

With reference to the block diagram of FIG. 9, it is reaffirmed that the local bitmask buffer is set to zero (block BIM-0).

The second processing module 250 is so configured as to receive in input an input span read by the macro-block display list being processed (block IN-SD) and to control whether the input span results to be completely occluded or not (block S-FO). Particularly, the second processing module 250 is adapted to verify whether all the bits of the local bitmask buffer which overlap the span under processing (in accordance with the respective offset and size values thereof, read by the display list) are all set, for example, to the value of 1.

It shall be noted that the condition of bits of the local bitmask buffer set to 1 implies that an occluding-type span has been read and pre-processed by the display list. Considering that, as specified before, the data processing is performed in an inverse order, the pre-processed span (that will be rendered in reality, on the scene, in front of the span which is being processed) would have already been rendered as an occluding span, therefore the span under processing is to be considered as occluded. It is reaffirmed that the second processing module 250 manages to achieve this conclusion by implementing the culling algorithm since, advantageously, the local bitmask buffer 252 is set to 1.

In the case where at least one bit of the local bitmask buffer 252 which overlaps the span under processing is equal to 0, then the second processing module 250 is such as to consider the span under processing as partially visible.

Instead, in the case where all the bits of the local bitmask buffer 252 which overlap the span under processing are equal to 0, then the second processing module 250 is such as to consider the span under processing as completely visible.

In more detail, in the case where the span is considered as completely occluded, the second processing module 250 is so configured as to mark the span under processing as "SPAN NOT TO BE PROCESSED" by modifying the operative code associated thereto (block MS-K) to a given value, and to continue the data rendering process by receiving the successive input span (block IN-DS).

In the case where the span under processing is considered as completely visible, the second processing module 250 is intended to control whether it is an occluding-type span (operative code representative of "OCCLUDING SPAN") (block SP-OC). In the affirmative case, the second processing module 250 is so configured as to revise to the value of 1 the bits of the local bitmask buffer 252 which overlap the span under processing (block UP-BM).

In the final case in which the span under processing is considered as partially visible, the second processing module 250 is so configured as to control whether it is an occluding span (block SP-OC) and, in the affirmative case, to consequently revise the local bitmask buffer 252 (block UP-BM). In addition, the second processing module 250 is intended to perform a span shrinking operation in the case where only the span ends result to be occluded (block SH-SP). Such shrinking operation consists in the removal from the right-most or left-most bits representative of the ends, when they are occluded, i.e., they overlap a bit of the local bitmask buffer 252 having a value equal to 1. In the case where such ends are of the occluded type and the span is partially occluding, the second processing module 250 is so configured as to revise the local bitmask buffer 252.

It is recalled that what has been hereto described with reference to the block diagram of FIG. 9 relates to a first pre-processing of the data withdrawn from a display list in a so-called inverse order so as to advantageously allow marking all the completely occluded spans. Therefore, the second processing module 250 is configured to efficiently process the display list relative to each macro-block of the screen by discarding all the spans having the "SPAN NOT TO BE PROCESSED" operative code contextually to the context associated thereto. This allows considerably reducing the computation times and the band.

In more detail, after the pre-processing of the culling algorithm of the occluded spans, the second processing module 250 is so configured as to perform the very processing of the loaded display list, which can be therefore correctly read by following a natural order, i.e., from the beginning to the end thereof.

Particularly, when a display list element is read which has an operative code representative of a context, such context is read by the scene buffer 260 starting from the memory address stored in the 28-bit field of the display list element currently read (pointer to the context).

It shall be noted that the reading of the context simply consists in setting the local context of the fragment processor 270 by using as current values those read by the scene buffer 260.

Once the context has been set, the second processing module 250 is so configured as to read one or more display list elements representative of a sub-span (in the case of a sub-internal span, a 32-bit element is read; in the case of sub-border spans, two elements are read: 32 bits for the offset and size values, and 32 bits for the coverage value).

Starting from said offset and size values, and once the size of an individual macro-block (N×M) is known, the second processing module 250 is so configured as to compute the starting point (Xstart; Ystart) and the endpoint (Xend; Yend) coordinates of the span by implementing the following mathematic relationships:

$$Y\text{start}=Y\text{end}=\text{blockOffset}Y+\text{offset}/N \quad (1.5)$$

$$X\text{start}=\text{blockOffset}X+\text{offset}\%N \quad (1.6)$$

$$X\text{end}=X\text{start}+\text{size} \quad (1.7)$$

in which $$\text{blockOffset}X=i\times N \quad (1.8)$$

$$\text{blockOffset}Y=j\times M \quad (1.9)$$

where i and j indicate the coordinates which individuate the general macro-block under processing. The macro-block (0, 0) is considered as the macro-block in the lower left hand corner of the frame buffer 290 (for example, the display screen 30). The macro-blocks (i, 0) internally come back into the lower line, composed of M horizontal lines of the frame buffer, while the macro-blocks (0, j) indicate the left-most column composed of the first N vertical lines of the frame buffer 290.

In addition, once the processing of a current macro-block has been completed, the second processing module 250 is so configured as to provide the data relative to the macro-block processing, via the fragment processor 270 and the macro-block memory module 280, to one or more frame buffers 290 external to the graphics pipeline 200 (for example, display 30, alpha mask buffer, and so on).

As it shall be noted, the graphics pipeline 200 may have several advantageous aspects.

Particularly, the positioning of the rasterizer module 230 upstream the first processing module 240 and the second processing module 250 allows the graphics pipeline 200 to process span-type primitives by clipping them into sub-span type primitives that can be associated to fixed portions (macro-blocks) of the display screen. Due to the fact that each sub-span, by definition, does not ever result to be larger than an individual macro-block, it is advantageously possible to implement an overdraw reduction factor, since the implementation of the culling algorithm results to be simpler on such small entities.

Again, the above-mentioned order of the graphics pipeline 200 modules further involves the advantages that the scene context to be stored in the scene buffer is in reality a sub-context intended only to the fragment processor, and therefore it is more compact than the total scene context intended to the whole graphics pipeline. In this manner, it is possible to achieve a reduction of the reading/writing band of the scene buffer.

Furthermore, the processing of one macro-block at a time advantageously allows maintaining the bandwidth confined within the graphics pipeline 200 and in an internal memory module 280 representing the macro-block.

In addition, the fact that the primitives (spans) exiting the rasterizer module 230 are associated to the macro-blocks advantageously implies that no particular operations of reconfiguration or modification (hardware or software) of the same rasterizer module are involved.

Again, the technical characteristic relative to the compact representation of the data (context and span-type primitives) according to a display list organization, each associated to a macro-block of the screen, advantageously allows saving the internal write (traffic from first processing module (binner) to scene buffer) and reading (traffic from scene buffer to second processing module (parser)) band.

Furthermore, the implementation of a culling algorithm on span-type primitives advantageously allows increasing the efficiency of the culling test, reducing the actual number of spans to be rendered, and decreasing as much as possible, from a computational point of view, the processing times of the graphics pipeline and the write/read band from both internal (for example, the memory dedicated to the macro-block) and external (for example, the frame buffer) buffers to the graphics pipeline.

The various embodiments described above can be combined to provide further embodiments. Each of the characteristics described as belonging to a possible embodiment can be implemented independently from the other embodiments described. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A graphics module, comprising:
a sort-middle graphics pipeline, said sort-middle graphics pipeline including:
a scene buffer; and
one or more processing devices configured to implement:
a first processing module configured to clip a span-type input primitive received from a rasterizer module into sub-span type primitives to be associated with respective macro-blocks corresponding to portions of a display screen and to store said sub-span type primitives in the scene buffer, wherein the respective macro-blocks are of a size N×M, where N and M are greater than 1 and represent a number of pixels of the display screen; and
a second processing module configured to reconstruct, starting from the sub-span type primitives, the span-type input primitive, the second processing module being further configured to cull occluded sub-span type primitives of the sub-span type primitives.

2. The graphics module according to claim 1 wherein the first processing module is further configured to organize the sub-span type primitives stored in the scene buffer according to a list-type data structure.

3. The graphics module according to claim 2 wherein the list-type data structure comprises a plurality of display list arrays and an array of display list headers.

4. The graphics module according to claim 3 wherein each display list array comprises mutually concatenated display list portions representative of memory portions of the scene buffer.

5. The graphics module according to claim 4 wherein each element of the display list headers is representative of an address of a portion of the scene buffer in which a first portion of each display list array is allocated.

6. The graphics module according to claim 5 wherein each portion of the display list array comprises a plurality of display list elements and a pointer to a successive display list portion.

7. The graphics module according to claim 2 wherein the second processing module is further configured to process the list-type data structure relative to an individual macro-block according to a processing order which begins from a last display list element stored in the scene buffer by the first processing module and ends with a first display list element stored in the scene buffer by the first processing module.

8. The graphics module according to claim 7 wherein the sort-middle graphics pipeline further comprises a fragment processor configured to receive the span-type input primitive reconstructed by the second processing module.

9. The graphics module according to claim 8 wherein said sort-middle graphics pipeline further comprises a macro-block memory module to store pieces of information relative to a macro-block under processing.

10. The graphics module according to claim 1 wherein the first processing module is further configured to receive a piece of information representative of a sub-context of a bidimensional scene, and to store said piece of information in the scene buffer.

11. The graphics module according to claim 10 wherein the first processing module includes a first local write memory buffer configured to locally store the scene sub-context before transferring it to the scene buffer.

12. The graphics module according to claim 11 wherein the first processing module further includes an internal register for storing a memory address representative of the scene buffer area into which the sub-context is to be stored.

13. The graphics module according to claim 12 wherein the first processing module is further configured to store the piece of information relative to the sub-context in a display list of the respective macro-block.

14. The graphics module according to claim 1 wherein the first processing module is further configured to mark a span-type primitive as being qualified as occluded.

15. The graphics module according to claim 1 wherein the second processing module includes a second local memory buffer configured to store a display list associated to a macro-block under processing.

16. The graphics module according to claim 1 wherein the second processing module includes a local bitmask buffer configured to check whether the span-type input primitive is occluded or not.

17. The graphics module according to claim 16 wherein said local bitmask buffer has a size equal to that of a macro-block.

18. The graphics module according to claim 1, further comprising a driver module and a filtering pipeline, the driver module being configured to receive instructions from a graphics application and to provide respective pieces of information to the sort-middle graphics pipeline and to the filtering pipeline.

19. The graphics module according to claim 18 wherein the sort-middle graphics pipeline further comprises a path stage to receive from the driver module a piece of information of a path type and to provide to the rasterizer module a piece of information of a simplified path type.

20. The graphics module of claim 1 wherein N and M are fixed.

21. A graphics system, comprising:
a processing unit;
a memory module operatively associated to said memory module; and
a graphics module operatively associated to said processing unit, the graphics module configured to render a bidimensional scene on a display screen, the graphics module including a sort-middle graphics pipeline,
wherein the sort-middle graphics pipeline is configured to include:
a scene buffer;
a first processing module configured to clip a span-type input primitive received from a rasterizer module into sub-span type primitives associated with respective macro-blocks corresponding to portions of the display screen and to store said sub-span type primitives in the scene buffer, wherein the respective macro-blocks are of a size N×M, where N and M are greater than 1 and represent a number of pixels of the display screen; and
a second processing module configured to reconstruct, starting from the sub-span type primitives, the span-type input primitive, and to cull occluded sub-span type primitives of the sub-span type primitives.

22. The graphics system according to claim 21, being one of a set-top box HDTV, a mobile telephone, a PDA palmtop, a terrestrial digital receiver, a DVIX reader, an MP3 reader, a personal computer, and a game console.

23. The graphics system according to claim 21, wherein the first processing module is further configured to organize the sub-span type primitives stored in the scene buffer according to a list-type data structure.

24. The graphics system according to claim 23 wherein the second processing module is further configured to process the list-type data structure relative to an individual macro-block according to a processing order which begins from a last display list element stored in the scene buffer by the first processing module and ends with a first display list element stored in the scene buffer by the first processing module.

25. The graphics system according to claim 21 wherein the first processing module is further configured to receive a piece of information representative of a sub-context of the bidimensional scene, and to store said piece of information in the scene buffer.

26. The graphics system according to claim 21 wherein the first processing module is further configured to mark a span-type primitive as being occluded.

27. The graphics system according to claim 21 wherein the second processing module includes a second local memory buffer configured to store a display list associated to a macro-block being processed and a local bitmask buffer configured to check whether the span-type input primitive is occluded or not.

28. The graphics system according to claim 21, wherein the graphics module further includes a driver module and a filtering pipeline, the driver module being configured to receive instructions from a graphics application and to provide respective pieces of information to the sort-middle graphics pipeline and to the filtering pipeline.

29. The system of claim 21 wherein N and M are fixed.

30. A method, comprising:
rendering a bidimensional scene on a display screen, the rendering including:
clipping, under control of a first processing module, a span-type input primitive received from a rasterizer module into sub-span type primitives associated with respective macro-blocks corresponding to portions of the display screen, wherein the respective macro-blocks corresponding to the portion of the display screen are of a fixed size N×M, where N and M are greater than 1 and represent a number of pixels of the display screen;
storing the sub-span type primitives in a scene buffer;
reconstructing, under control of a second processing module, the span-type input primitive starting from the sub-span type primitives; and
culling, under control of the second processing module, an occluded span-type input primitive of the span-type input primitive.

31. The method according to claim 30 wherein the step of storing the sub-span type primitives comprises marking, under control of the first processing module, the span-type input primitive as an occluded span-type input primitive when the span-type input primitive is qualified as occluded.

32. The method according to claim 30 further comprising, under control of the first processing module, storing the sub-span type primitives in the scene buffer according to a list-type data structure.

33. The method according to claim 32 further comprising, under control of the second processing module, processing the list-type data structure relative to an individual macro-block according to a processing order which begins from a last display list element stored in the scene buffer by the first processing module and ends with a first display list element stored in the scene buffer by the first processing module.

34. The method according to claim 30 further comprising, under the control of the first processing module, receiving a piece of information representative of a sub-context of the bidimensional scene, and storing the piece of information in the scene buffer.

\* \* \* \* \*